Oct. 6, 1959         C. G. GIBSON              2,907,247
                     SIGHTING DEVICE
Filed Sept. 17, 1956                        2 Sheets-Sheet 1

INVENTOR.
Charles G. Gibson
BY
S. E. Ross
ATTORNEY

Oct. 6, 1959 C. G. GIBSON 2,907,247
SIGHTING DEVICE
Filed Sept. 17, 1956 2 Sheets-Sheet 2
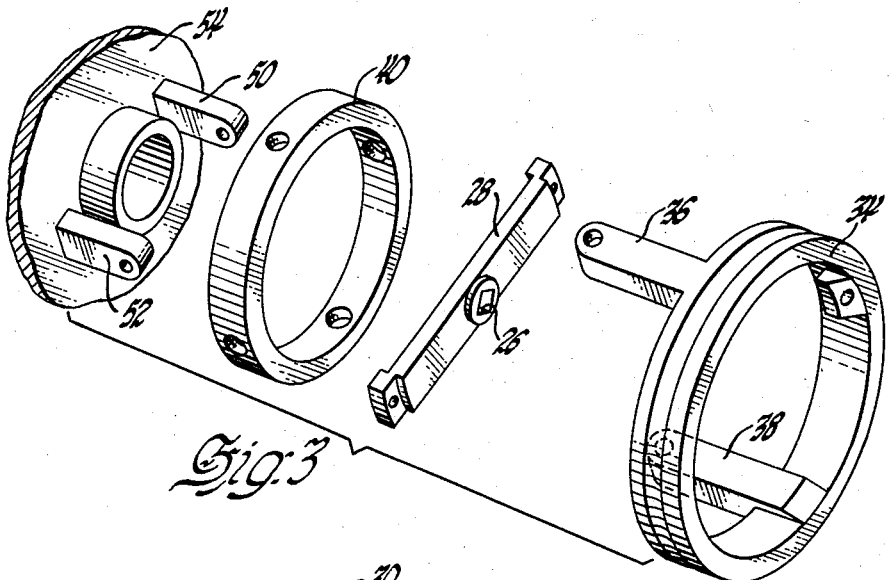
Fig. 3
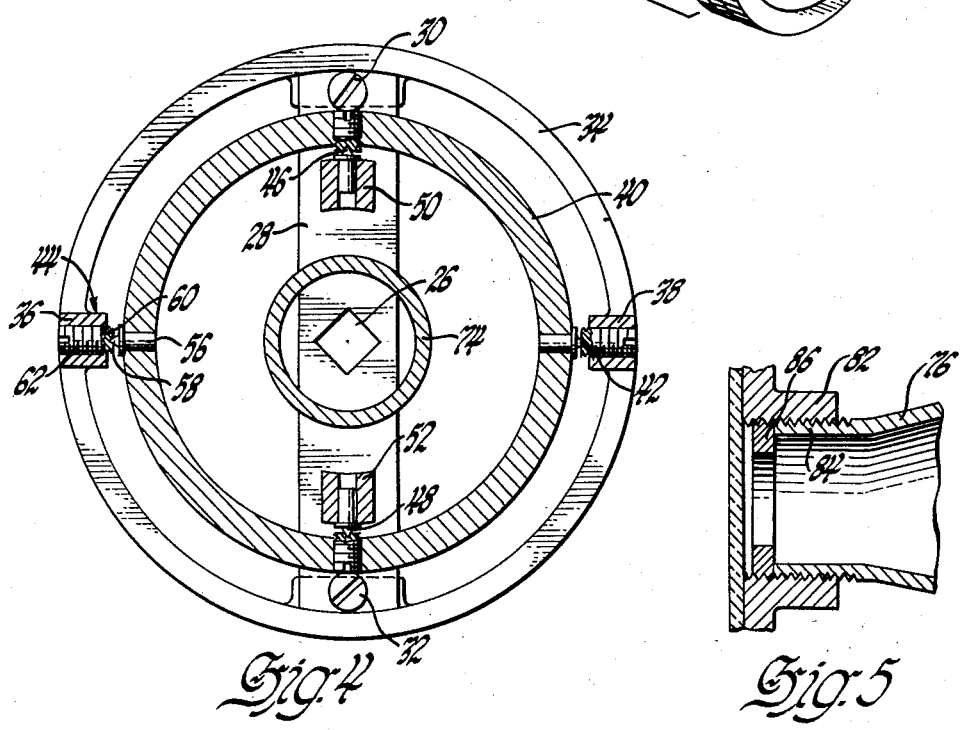
Fig. 4
Fig. 5
INVENTOR.
Charles G. Gibson
BY
S. E. Ross
ATTORNEY United States Patent Office 2,907,247
Patented Oct. 6, 1959

2,907,247

SIGHTING DEVICE

Charles G. Gibson, Warren, Mich., assignor to General Motors Corporation, Detroit, Mich., a corporation of Delaware Application September 17, 1956, Serial No. 611,411

6 Claims. (Cl. 88—1)

This invention relates to sighting apparatus for guns and the like. More particularly, it relates to an improved optical device for use in such sighting apparatus.

One object of the invention is the provision of an improved sighting apparatus which is of relatively low volume and which therefore requires small installation space.

Another object of the invention is an improved sighting device wherein the design and arrangement of the component parts are such that there is more efficient space utilization.

Still another object of the invention is the provision of an improved sighting device which allows for greater angular movement of the optical image thereof, thus increasing the range of the device.

Other objects and advantages of the invention will appear more clearly from the following description of a preferred embodiment and from the drawings in which:

Figure 3 is an enlarged exploded view in perspective of an assembly which forms a part of the sight shown in Figures 1 and 2;

Figure 4 is an enlarged view taken on the line 4—4 of Figure 2; and

Figure 5 is an enlarged sectional view of a connection assembly shown in Figure 2.

Figure 1:
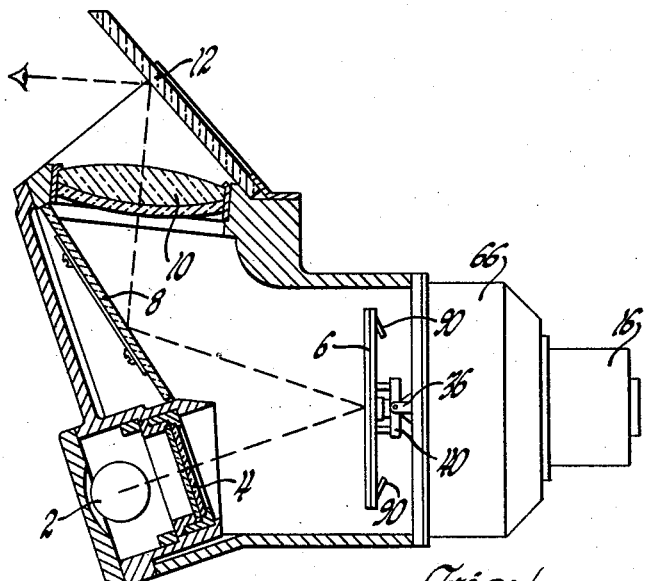
Figure 1 is a side view in partial section of a gun sight embodying the invention.

Referring now to Figure 1, there is shown a predictor gun sight for use, for example, in an airplane and including a light source 2, a reticle disc 4, a gyro or radar controlled tiltable mirror 6, a stationary mirror 8, a collimating lens 10 and a transparent viewing screen 12. In operation, the light source projects through reticle disc 4 and against the tiltable mirror 6, a beam of light which is there directed to stationary mirror 8 to be reflected through collimating lens 10 and onto the viewing screen 12 where it appears as a light pip, focused at infinity, for view by the gunner. It will be obvious that the location of the light pip on viewing screen 12 will be determined by the precise angular position of the tiltable mirror 6. The present invention provides an improved assembly for driving and for controlling the angular position of the mirror 6.

Figure 2:
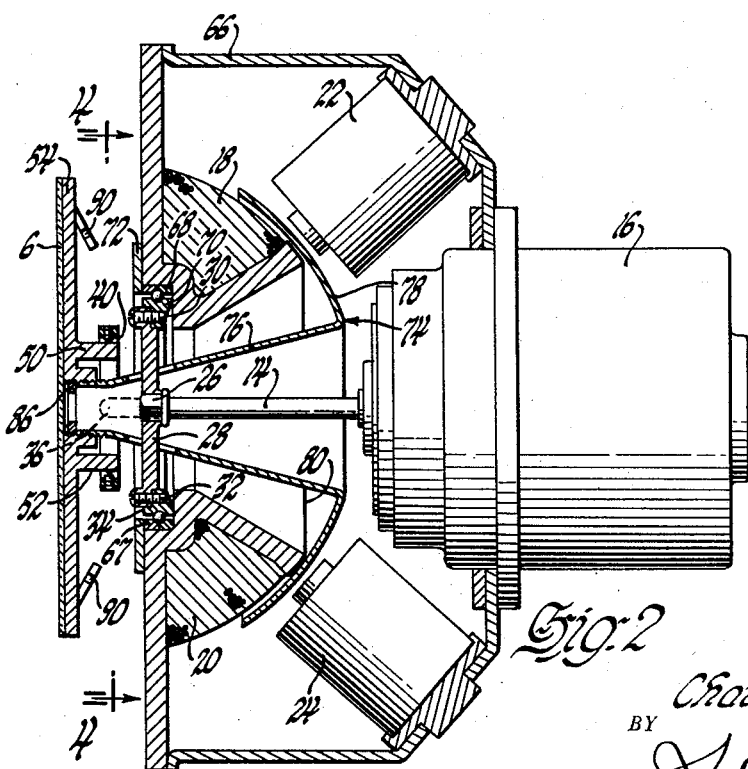
Figure 2 is an enlarged side view in partial section of the rear portion of the gun sight shown in Figure 1.

In Figure 1, and more clearly in Figure 2, there is shown a preferred embodiment of the invention wherein 14 is a rotatable drive shaft driven by electric motor 16, and 18, 20, 22 and 24 are electromagnets. The magnetic fields of the electromagnets may be controlled by either radar apparatus for radar sighting, or gyro and other apparatus such as is used for visual sighting. The function and purpose of the remaining structure now to be described is to impart the rotary motion of shaft 14 to the flat round mirror 6 by means of a connection which will allow limited universal movement of the mirror to any plane, and to provide means whereby the plane of the mirror 6 is determined by the magnetic fields established by the electromagnets indicated at 18, 20, 22 and 24.

Referring now to Figures 3 and 4 as well as to Figures 1 and 2, the rotary motion of shaft 14 is conveyed to mirror 6 through a Hooke's suspension type joint. The free end of shaft 14 has a head portion 26 of square section. This head portion is secured snugly within a square opening in the middle of a generally bar shaped metal yoke 28 which is positioned at a right angle to the shaft 14. Secured to the yoke 28 as by threaded members 30 and 32 is a metal ring 34, the axis of rotation of which is defined by the shaft 14. This ring has two diametrically opposed projections 36 and 38 extending parallel to shaft 14, these projections being connected to a second metal ring 40 which is somewhat smaller in diameter than ring 34, through a pair of needle point pivot bearings 42 and 44. Thus, ring 40 is free to pivot with respect to ring 34 about the axis defined by the two diametrically opposed pivot bearings 42 and 44. A second set of diametrically opposed needle point pivot bearings 46 and 48 connect ring 40 to a pair of lugs 50 and 52 which are secured to and extend outwardly from a round metal plate 54 to which the mirror 6 is fixedly secured as by cement or the like. Thus, the plate 54 and attached mirror are free to pivot on the axis defined by the bearings 46 and 48, the axis defined by this second set of needle point bearings 46 and 48 being perpendicular to the pivot axis defined by the first-mentioned set of pivot bearings 42 and 44. Therefore the mirror may take a position in any plane, within limits, the above-described suspension serving as a universal joint through which the rotary motion of shaft 14 is imparted to the mirror 6.

The structure of each of the needle point pivot bearings is exemplified by that shown at 44 which comprises a metal pin 56 having a cylindrical portion secured within a hole in the metal ring 40, as by brazing, and a conical shaped point 58 which nests in a hard jewel bearing member 60. The jewel bearing is secured to the end of a threaded member 62 which threadedly and therefore adjustably engages a threaded hole in projection 36. Thus, the contact pressure of the point 58 against the jewel bearing may be adjusted by turning the threaded member 62.

Electromagnets 18, 20, 22 and 24 and the shaft 14 are enclosed within a housing 66 having a round opening therein through which the shaft extends, the square head portion 26 of the shaft being located in the plane of said opening. Positioned about the periphery of this opening is a ring bearing 67 consisting of an outer race 68, ball bearings 70 and an inner race which, in the embodiment shown, is formed by the outer periphery of ring 34. It may be preferable for ease in assembly operations to form the inner race of the bearing as a separate member to which the ring 34 may be secured by screws or by brazing. Also, for ease in assembly, it may be desirable to form the outer race of the bearing in two axial portions, as shown in Figure 2. An annular shaped retainer plate 72 may be used to fixedly secure the bearing to the housing 66.

Thus, the shaft 14, the Hooke's suspension joint and the mirror assembly are supported for rotary motion with respect to the housing by means of the ring bearing 67.

Fixedly secured to the center of the mirror back-up plate 54 is a domed metal member 74 having a conical portion 76 which tapers outwardly as it extends away from the plate 54 and into the housing 66, and an annular spherical shaped dome portion 78 which adjoins to the base of the cone portion. The dome portion 78 is positioned in the generally spherical shaped space between electromagnets 18 and 22 and 20 and 24. The geometric center of this spherical shaped space and of the spherical surface formed by dome portion 78 is located at the center of the round mirror 6. It will be noted that because of the conical shape of portion 76 through which shaft 14 extends, the member 78 is free to rock in all directions with respect to the shaft. It will also be noted that the inner surfaces, as indicated at 80, of the electromagnets 18 and 20 are also conically shaped and are spaced from the conical shaped portion 76 of the domed member 74 to allow rocking movement in any direction. Adjacent the apex of conical portion 76 there are a pair of opposed openings through which extend the ends of the yoke 28.

To fixedly secure the domed member 74 to the mirror 6, the center of the mirror back-up plate 54 is formed with an internally threaded annular collar 82. The small diametered end of conical portion 76 of the domed member terminates in an externally threaded cylindrical portion 84 which threadedly engages the collar 82. A threaded lock washer 86 may be used to lock the parts together. It will be obvious that in the embodiment shown, the dome shaped member 74 must be secured to the mirror back-up plate 54 prior to securing the mirror 6 to said plate.

The domed member 74 is constructed of a highly nonmagnetic material such aluminum. Thus, as it spins between the pole pieces of the electromagnets, eddy currents are established around the domed portion thereby setting up a mechanical drag which is determined by the strength of the magnetic field.

The rear surface of the plate 54 may be provided with a series of circumferentially arranged tabs 90 which can be bent toward or away from the mirror so as to provide the proper balance. Other weighting means may also be used in place of or in addition to the tabs 90, to properly balance the mirror-dome assembly on the pivots of the Hooke's type suspension and to establish equal weight distribution about the axis of rotation defined by shaft 14.

An important feature and advantage of the device which can best be seen by reference to Figure 2 is that the electric motor 16 which drives the shaft 14 is positioned directly behind the mirror 6, a substantial front portion of the motor being positioned between electromagnets 22 and 24 and within the housing 66. This space-saving arrangement whereby the electric motor is positioned behind the mirror where it is out of the way and where there is space between the electromagnets to accommodate it, is afforded by way of the novel structure and arrangement of the driven components, most particularly, the domed member 74.

Operation of the device is as follows: Prior to use, the assembly is accurately balanced by means of the tabs 90 or by other suitable weighting means as described above. Motor 16 is actuated thereby causing rotation of mirror 6 and attached domed member 74, such rotary motion being transmitted through the shaft 14 and the universal joint suspension described above with reference to Figures 3 and 4. As the mirror and domed member 74 rotate, their angular position with respect to shaft 14 is determined and controlled by the magnetic fields of electromagnets 18, 20, 22 and 24 which electromagnets are, of course, connected for control by the radar or visual sighting computing apparatus used in conjunction with the sight. For example, as the magnetic fields change, the dome portion 78 of the member 74 may be moved down and to the left thereby causing the mirror 6 to assume a new position in the plane established by such shift in the position of the dome portion 78. The conical portion 76 of the rotating domed member which is spaced from shaft 14 and surfaces 80 allows an angular shift of a considerable number of degrees to left, right, up or down, this being another very desirable feature of the device. As indicated above, the angular position of the plane of mirror 6 determines the location of the light pip on viewing screen 12. Thus, the device provides means for controlling the movement and location of the light pip for sighting in accordance with data computed and relayed to the device from radar or visual sighting apparatus.

While the invention has been described by reference to a preferred embodiment thereof, it is understood that changes may be made and modifications used, all within the full and intended scope of the claims which follow.

I claim:

1. An optical device for sighting apparatus comprising a drive shaft, two spaced sets of electromagnets arranged about the axis of rotation of said shaft, a rotatable mirror, a universal joint connecting one end of said shaft to said mirror to transfer the rotary motion of said shaft to said mirror and to allow said mirror to pivot in all directions with respect to said shaft, an electrical conductive member having a hollow stem portion positioned about said shaft with one end fixedly secured to said mirror and an annular generally spherical shaped dome portion joined to and extending outwardly from the other end of said stem portion, said dome portion being positioned in the space between said sets of electromagnets, and means connected to the other end of said shaft to cause rotation of said shaft.

2. An optical device for sighting apparatus comprising a drive shaft, a motor connected to said shaft to cause rotation thereof, two spaced sets of electromagnets, each set arranged about the axis of rotation of said shaft, a rotatable mirror, a universal joint connecting said shaft to said mirror to transfer the rotary motion of said shaft to said mirror and to allow said mirror to pivot in all directions with respect to said shaft, and a metal member having a hollow stem portion positioned about said shaft and secured for rotation and pivotal movement with said mirror, and an annular generally spherical shaped dome portion joined to and extending outwardly from said stem portion, said dome portion being positioned in the space between said sets of electromagnets.

3. An optical device for sighting apparatus comprising a drive shaft, a motor connected to said shaft to cause rotation thereof, two sets of electromagnets, each arranged about the axis of rotation of said shaft, said sets of electromagnets having a generally spherical shaped space therebetween, a rotatable mirror, a universal joint connecting said mirror to said drive shaft to transfer the rotary motion of said shaft to said mirror and to allow said mirror to tilt in all directions with respect to said shaft, and a metal member having a conical shaped stem portion positioned about said shaft with its apex end fixedly secured to said mirror, and an annular generally spherical shaped dome portion joined to end extending outwardly from the base of said cone portion, said dome portion being positioned in the spherical shaped space between said sets of electromagnets.

4. An optical device for sighting apparatus comprising a drive shaft, a motor connected to one end of said shaft to cause rotation thereof, two sets of electromagnets, each arranged about the axis of rotation of said shaft, said sets of electromagnets having a generally spherical shaped space therebetween, a rotatable mirror, a universal joint connecting said mirror to the other end of said drive shaft to transfer the rotary motion of said shaft to said mirror and to allow said mirror to pivot in all directions with respect to said shaft, and a metal member having a conical shaped stem portion positioned about said shaft with its apex end fixedly secured to said mirror and an annular generally spherical shaped dome portion joined to and extending outwardly from the base of said cone portion and positioned in the spherical shaped space between said sets of electromagnets, the center of spherical curvature of said dome portion and of the space between said sets of electromagnets being located approximately at the center of said mirror.

5. An optical device for sighting apparatus comprising a housing having a round opening therein, a drive shaft in said housing having one end terminating in the plane of said opening, a motor in said housing connected to the other end of said shaft to cause rotation thereof, two sets of electromagnets in said housing, each set arranged about the axis of rotation of said shaft, said sets of electromagnets having a generally spherical shaped space therebetween, a rotatable mirror outside said housing adjacent the opening therein, a universal joint connecting said mirror to said drive shaft to transfer the rotary motion of said shaft to said mirror and to allow said mirror to pivot in all directions with respect to said shaft, a metal member having a conical shaped stem portion positioned about said shaft with its apex end fixedly secured to said mirror and an annular generally spherical shaped dome portion joined to and extending outwardly from the base of said cone portion and positioned in the spherical shaped space between said sets of electromagnets, and a ring bearing positioned in said opening having an outer race secured to said housing and an inner race secured to said shaft to support said shaft, said universal joint, said mirror and said metal member for rotary movement with respect to said housing.

6. In a predictor gun sight, a round rotatable mirror, a metal member having a conical portion with its apex end fixedly secured to the back surface of said mirror at the center thereof and an annular generally spherical shaped dome portion joined to and extending outwardly from the base of said cone portion, a drive shaft extending through said cone portion, a motor positioned on the side of said dome portion oppositely disposed from said mirror and connected to said shaft to cause rotation thereof, a universal joint connecting said shaft to said mirror to cause rotation and to allow pivotal movement of said mirror and said metal member, and a set of electromagnets positioned on each side of the dome portion of said metal member.

References Cited in the file of this patent

UNITED STATES PATENTS

| | | |
|---|---|---|
| 2,467,831 | Johnson | Apr. 19, 1949 |
| 2,527,245 | Cunningham | Oct. 24, 1950 |
| 2,694,869 | McNatt | Nov. 23, 1954 |
| 2,756,625 | Johnson | July 31, 1956 |

UNITED STATES PATENT OFFICE

CERTIFICATE OF CORRECTION

Patent No. 2,907,247                                              October 6, 1959

Charles G. Gibson

It is hereby certified that error appears in the printed specification of the above numbered patent requiring correction and that the said Letters Patent should read as corrected below.

Column 3, line 25, for "such aluminum" read -- such as aluminum --; column 4, line 51, for "end extending" read -- and extending --.

Signed and sealed this 12th day of April 1960.

(SEAL)
Attest:

KARL H. AXLINE                                           ROBERT C. WATSON
Attesting Officer                                       Commissioner of Patents